United States Patent
Miyazaki

(10) Patent No.: US 9,554,116 B2
(45) Date of Patent: Jan. 24, 2017

(54) IMAGE PICKUP ELEMENT AND IMAGE PICKUP APPARATUS

(71) Applicant: OLYMPUS CORPORATION, Tokyo (JP)

(72) Inventor: Kanto Miyazaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/694,572

(22) Filed: Apr. 23, 2015

(65) Prior Publication Data

US 2015/0229909 A1    Aug. 13, 2015

Related U.S. Application Data

(63) Continuation of application No. PCT/JP2013/004212, filed on Jul. 8, 2013.

(30) Foreign Application Priority Data

Oct. 24, 2012  (JP) ................................ 2012-234847

(51) Int. Cl.
  *H04N 13/02*  (2006.01)
  *H04N 5/335*  (2011.01)
  *G03B 35/10*  (2006.01)
  *H04N 5/225*  (2006.01)

(52) U.S. Cl.
  CPC .......... *H04N 13/0217* (2013.01); *G03B 35/10* (2013.01); *H04N 5/2254* (2013.01)

(58) Field of Classification Search
  CPC ............ H04N 13/0282; H04N 13/0296; H04N 13/0217; H04N 5/369; G02B 23/2415; G02B 7/34; H01L 27/14627
  USPC ................... 348/49, 46, 78, 48, 294
  See application file for complete search history.

(56) References Cited

U.S. PATENT DOCUMENTS

| | | | |
|---|---|---|---|
| 6,396,873 B1 | 5/2002 | Goldstein et al. | |
| 2006/0072029 A1* | 4/2006 | Miyatake ............. | G02B 3/0056 348/340 |
| 2009/0219432 A1 | 9/2009 | Palum et al. | |
| 2010/0225755 A1* | 9/2010 | Tamaki ................ | H04N 5/2257 348/78 |
| 2010/0238330 A1 | 9/2010 | Hirota | |

(Continued)

FOREIGN PATENT DOCUMENTS

| | | |
|---|---|---|
| JP | 2003-523646 A | 8/2003 |
| JP | 2009-065095 A | 3/2009 |

(Continued)

OTHER PUBLICATIONS

International Search Report dated Oct. 1, 2013, issued in corresponding application No. PCT/JP2013/004212.

(Continued)

*Primary Examiner* — Sinh Tran
*Assistant Examiner* — Xi Wang
(74) *Attorney, Agent, or Firm* — Westerman, Hattori, Daniels & Adrian, LLP

(57) ABSTRACT

A plurality of two-dimensionally arranged microlenses, a pair of light-receiving elements corresponding to the microlenses, and a light-controlling member configured to control incidence of light onto adjacent light-receiving areas of the pair of light-receiving elements are provided.

4 Claims, 9 Drawing Sheets

(56) References Cited

U.S. PATENT DOCUMENTS

| | | |
|---|---|---|
| 2011/0234767 A1* | 9/2011 | Tokiwa .............. H04N 13/0217 348/47 |
| 2011/0279727 A1 | 11/2011 | Kusaka |
| 2012/0212581 A1* | 8/2012 | Nagata .............. H04N 13/0217 348/46 |
| 2012/0212662 A1* | 8/2012 | Shimoda ............ H04N 5/23212 348/349 |
| 2013/0038691 A1* | 2/2013 | Agranov ............ H04N 13/0228 348/46 |
| 2013/0083230 A1 | 4/2013 | Fukuda |
| 2013/0128085 A1 | 5/2013 | Yamada |
| 2013/0161774 A1 | 6/2013 | Okigawa |
| 2013/0250426 A1* | 9/2013 | Hattori ................ G02B 3/0031 359/619 |
| 2014/0306095 A1 | 10/2014 | Nobayashi |

FOREIGN PATENT DOCUMENTS

| | | |
|---|---|---|
| JP | 2009-158800 A | 7/2009 |
| JP | 2010-239337 A | 10/2010 |
| JP | 2011-515045 A | 5/2011 |
| JP | 2011-176715 A | 9/2011 |
| JP | 2013-093554 A | 5/2013 |
| JP | 2013-110548 A | 6/2013 |
| JP | 2013-150314 A | 8/2013 |
| WO | 2012/026292 A1 | 3/2012 |
| WO | 2013/099910 A1 | 7/2013 |

OTHER PUBLICATIONS

Office Action dated Oct. 25, 2016, issued in counterpart Japanese Patent Application No. 2012-234847, with English translation. (19 pages).

* cited by examiner

IMAGE PICKUP ELEMENT AND IMAGE PICKUP APPARATUS

CROSS-REFERENCE TO RELATED APPLICATION

This application is a continuation of International Application No. PCT/JP2013/004212, with an international filing date of Jul. 8, 2013, which claims priority to and the benefit of Japanese Patent Application No. 2012-234847 filed Oct. 24, 2012, the entire contents of which are incorporated herein by reference.

TECHNICAL FIELD

This disclosure relates to an image pickup element, and an image pickup apparatus including the image pickup element, that is suitable for capturing a pair of images that have parallax to display a stereoscopic image.

BACKGROUND

In a known image pickup apparatus, a single image pickup element is used, and the pupil of the pickup lens is divided to capture a pair of images having parallax for displaying a stereoscopic image (for example, see JP 2011-515045 A and JP 2003-523646 A). The image pickup element used in this image pickup apparatus is provided with a plurality of microlenses in a two-dimensional array and a pair of light-receiving elements corresponding to each microlens and is disposed so that the pupil divided image of the pickup lens forms on each pair of light-receiving elements. In this way, a pixel signal to generate one captured image of a stereoscopic image is obtained from one light-receiving element, and a pixel signal to generate the other captured image of a stereoscopic image is obtained from the other light-receiving element.

CITATION LIST

Patent Literature

PTL 1: JP 2011-515045 A
PTL 2: JP 2003-523646 A

In this image pickup element, the pair of light-receiving elements corresponding to each microlens correspond to a picture element in the stereoscopic image, and each light-receiving element in the pair of light-receiving elements corresponds to a pixel in the pair of captured images having parallax. The parallax of the pair of captured images is determined by the distance between the centroids of the divided pupil of the pickup lens. In other words, the image of the exit pupil in the pickup lens is formed at a certain magnification on the light-receiving surface of each picture element in the image pickup element. Therefore, parallax is determined by the distance between the centroids of the pupil images formed on the pair of light-receiving elements of each picture element. As this parallax increases, the sense of stereoscopic effect of the stereoscopic image, i.e. the depth resolution, increases.

With the above-described image pickup element, however, it is difficult to obtain a large parallax. FIG. 10 illustrates one pair of light-receiving elements (picture elements) 300 in a background image pickup element, as seen from the light-receiving surface side. As illustrated in FIG. 10, the exit pupil of the pickup lens is flipped left-to-right and formed as an exit pupil image 3101 on the pair of light-receiving elements 300. The pair of light-receiving elements 300 include a light-receiving element 300L that receives the right-side image of the exit pupil image 3101, i.e. a captured light beam passing through the left side of the exit pupil (left-side pupil), and a light-receiving element 300R that receives the left-side image of the exit pupil image 3101, i.e. a captured light beam passing through the right side of the exit pupil (right-side pupil). The light-receiving elements 300L and 300R are separated into two areas by an inter-element separation layer 301.

In a background image pickup element, there is no dead zone on the pair of light-receiving elements 300 other than the inter-element separation layer 301, and most of the exit pupil image 3101 formed on the pair of light-receiving elements 300 is received by a pair of light-receiving elements 300L and 300R. Therefore, the centroids (marked with an x) of the pupil images formed on the light-receiving elements 300L and 300R are biased towards the inter-element separation layer 301, thereby reducing the inter-centroid distance cs. As a result, the parallax decreases, and the depth resolution of the stereoscopic image is reduced.

SUMMARY

My image pickup element includes: a plurality of two-dimensionally arranged microlenses; a pair of light-receiving elements corresponding to the microlenses; and a light-controlling member configured to control incidence of light onto adjacent light-receiving areas of the pair of light-receiving elements.

The light-controlling member may be a dividing wall.

The light-controlling member may be a wiring layer.

The relationship $0.128 \text{ fm} \leq h \leq 2/5 \text{ fm}$ may be satisfied, where $h$ is a height of the light-controlling member from a light-receiving surface of the pair of light-receiving elements, and $fm$ is a focal length of the microlenses.

Furthermore, my image pickup apparatus includes an imaging optical system configured to capture an object image; and one of the above image pickup elements, disposed on an expected focal plane of the imaging optical system.

DETAILED DESCRIPTION

The following describes embodiments with reference to the drawings.

Embodiment 1

Figure 1:
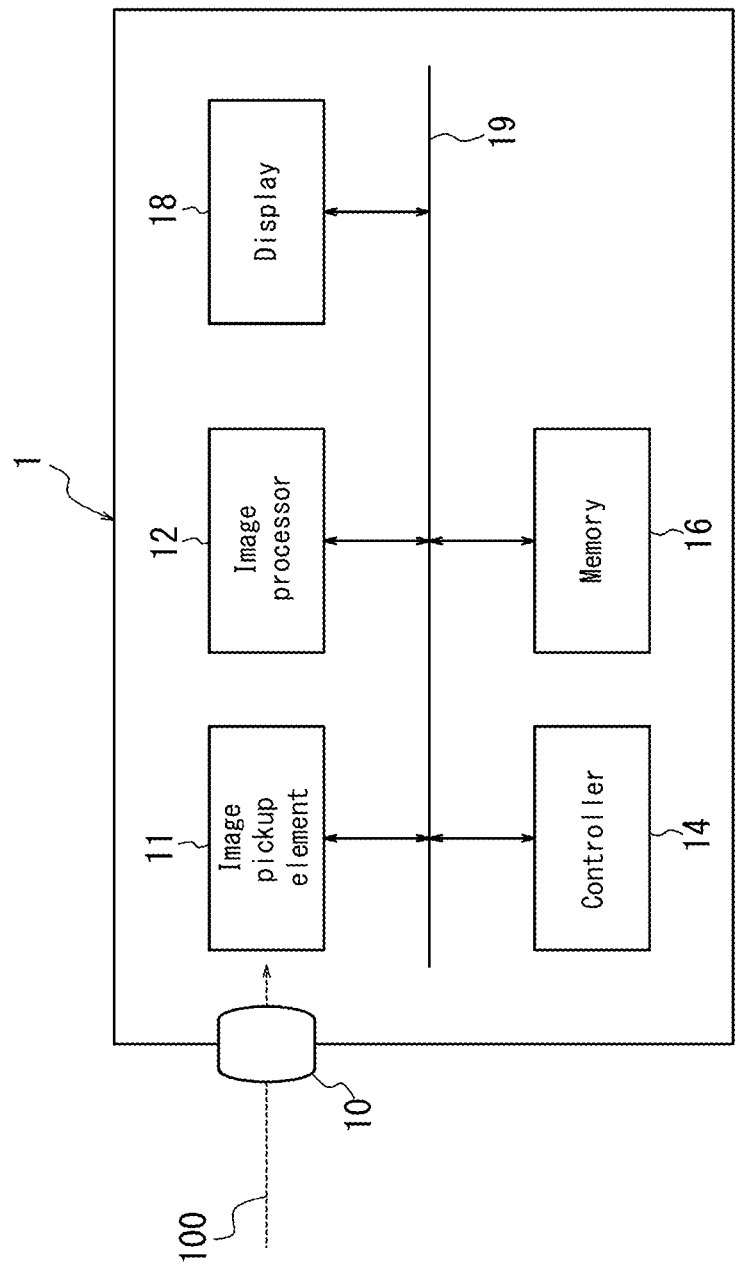
FIG. 1 is a functional block diagram schematically illustrating the structure of an image pickup apparatus according to Embodiment 1.

FIG. 1 is a functional block diagram schematically illustrating the structure of an image pickup apparatus according to Embodiment 1. Based on object light 100 from the object of shooting, the image pickup apparatus 1 according to this embodiment captures a pair of images having parallax for displaying a stereoscopic image. The image pickup apparatus 1 includes an imaging optical system 10, an image pickup element 11, an image processor 12, a controller 14, a memory 16, and a display 18. The image pickup element 11, image processor 12, controller 14, memory 16, and display 18 are connected by a bus 19 and can transmit and receive a variety of signals to and from each other.

The imaging optical system 10 includes a pickup lens and a diaphragm and captures an image of an object. The image pickup element 11 is disposed on an expected focal plane of the imaging optical system 10. Upon object light 100 entering via the imaging optical system 10, the image pickup element 11 captures a left-eye image and a right-eye image having parallax based on the object light 100 and outputs pixel signals forming each captured image. Each captured image is formed by two-dimensionally arranged pixels. The number of pixels constituting one frame of a captured image is, for example, from 640×480 pixels to 4000×3000 pixels, yet the number of pixels is not limited to this range. The image pickup element 11 is a Complementary Metal Oxide Semiconductor (CMOS) or Charge Coupled Device (CCD) having a light-receiving element disposed in correspondence with each pixel, generates a pixel signal via the light-receiving elements, and outputs the pixel signal. The pixel signal is, for example, generated and output frame by frame. The pixel signal is, for example, a signal indicating a gradation of the colors red (R), green (G), and blue (B) for each pixel. The pixel signal may also be a digital signal yielded, for example, by A/D conversion of the signal output from the light-receiving elements.

The image processor 12 performs predetermined image processing, such as color and luminance correction, distortion correction, and the like, as well as data compression and expansion on captured image data including the pixel signals for one frame. The image processor 12 for example performs image processing on the captured image data for each frame. The image processor 12 may, for example, be a processor such as a Digital Signal Processor (DSP) or an Application Specific Integrated Circuit (ASIC).

The memory 16 is a frame memory storing captured image data before and/or after image processing. The memory 16 is, for example, Static Random Access Memory (SRAM) or Dynamic RAM (DRAM). The memory 16 may include a data read/write device for a variety of storage media including a hard disk and portable flash memory.

The display 18 displays a 2D image or a stereoscopic image based on the captured image data. In the case of displaying a 2D image, the display 18 for example displays either the left or right captured image data. Alternatively, the display 18 may display a combination of the left and right captured image data. In the case of displaying a stereoscopic image, the display 18 for example includes a liquid crystal display (LCD) and a control circuit for the LCD, the LCD being provided with a polarization filter corresponding to the parallax between the left and right eyes. The display 18 displays the left and right captured image data having parallax so as to display a stereoscopic image that the user can perceive stereoscopically. The captured image data is read from the memory 16 and displayed on an external display device as a 2D image or a stereoscopic image.

The controller 14 sends control signals to the image pickup element 11, image processor 12, memory 16, and display 18 and comprehensively controls operations of the image pickup apparatus 1. The controller 14 is, for example, a microcomputer.

Figure 2:
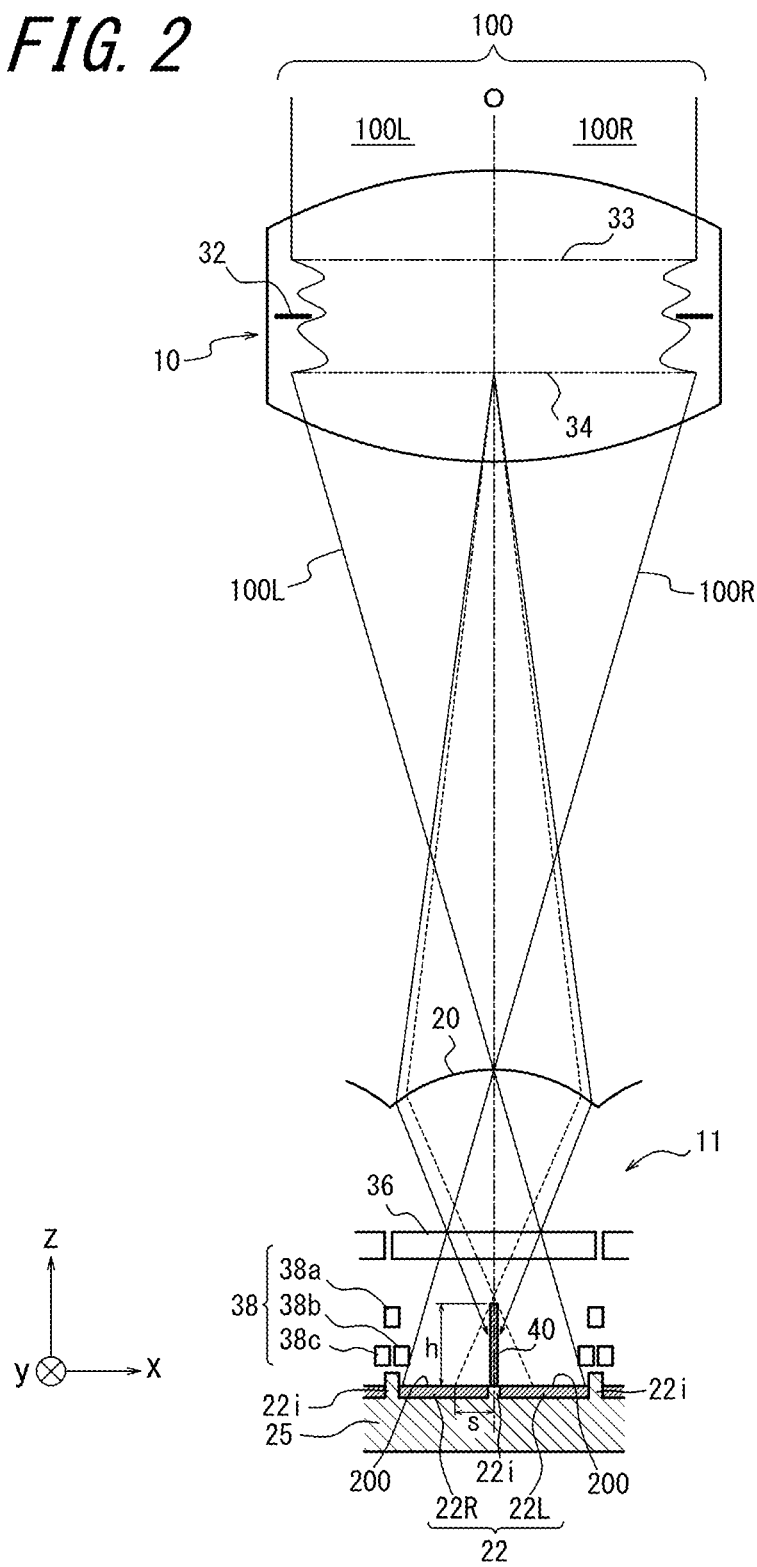
FIG. 2 illustrates the structure of a section of the imaging optical system and image pickup element in FIG. 1.

FIG. 2 is a schematic cross-sectional diagram along the optical axis of the imaging optical system 10, illustrating the structure of a section of the imaging optical system 10 and the image pickup element 11. In the imaging optical system 10, object light 100 is formed as an image on the image pickup element 11 after passing through an entrance pupil 33 and an exit pupil 34 that correspond to a diaphragm 32.

Figure 3:
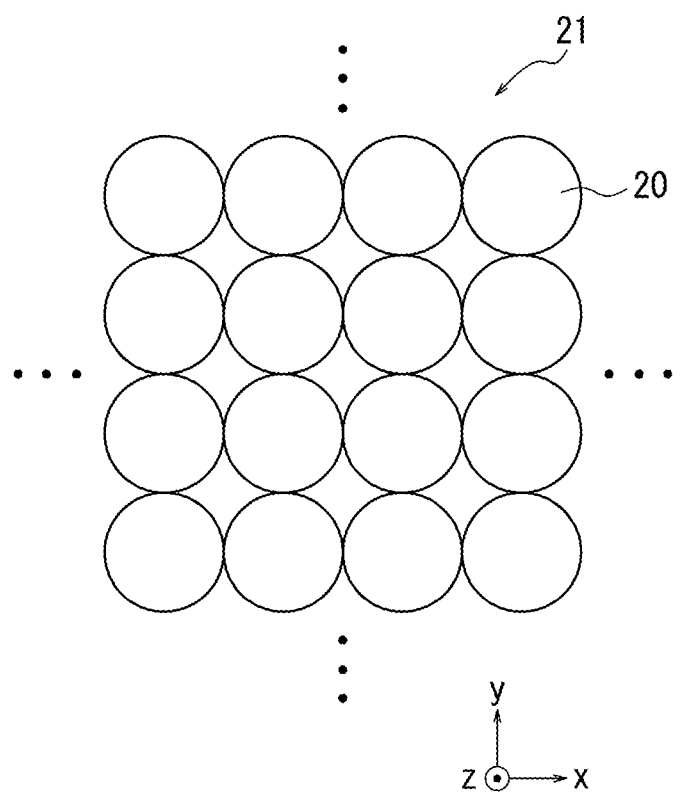
FIG. 3 is a plan view of the microlens array in FIG. 2.

As illustrated by the plan view from the direction of the optical axis of the imaging optical system 10 in FIG. 3, the image pickup element 11 is provided with a microlens array 21 that includes two-dimensionally arranged microlenses 20 on the entrance face side. In this embodiment, the microlenses 20 are each a spherical or aspherical microlens and are arranged in correspondence with picture elements of the stereoscopic image. For the sake of convenience, the direction of the z-axis corresponds to the direction of the optical axis of the imaging optical system 10 and the microlenses 20, the direction of the x-axis orthogonal to the z-axis corresponds to the horizontal direction of the captured image, and the direction of the y-axis orthogonal to both the z-axis and x-axis corresponds to the vertical direction of the captured image.

The image pickup element 11 includes a pair of light-receiving elements 22 corresponding to each microlens 20 and a color filter 36 provided between each microlens 20 and each pair of light-receiving elements 22. In FIG. 2, for the sake of convenience, the pair of light-receiving elements 22 and color filter 36 corresponding to a portion of the microlens array 21 are illustrated. Each pair of light-receiving elements 22 is separated by an element separation area 22i and includes light-receiving elements 22L and 22R adjacent along the x-axis, i.e. in the horizontal direction. The light-receiving elements 22R and 22L are, for example, photodiodes included in a CMOS or CCD formed on a semiconductor substrate 25 of silicon or the like. The light-receiving surface 200 of the light-receiving elements 22L and 22R is provided approximately at the back focal point of the microlens 20.

For a pair of captured images having parallax for displaying a stereoscopic image, the light-receiving element 22L generates and outputs a pixel signal forming a left-eye captured image. The light-receiving element 22R generates and outputs a pixel signal forming the right-eye captured image. Accordingly, the light-receiving elements 22L and 22R correspond to respective pixels in the pair of captured images for displaying a stereoscopic image. The color filter 36 is, for example, a color filter in a Bayer arrangement and is one of the colors R, G, and B for each picture element.

Furthermore, the image pickup element 11 includes a wiring layer 38 stacked between pairs of light-receiving elements 22 on the entrance face side of the semiconductor substrate 25. The wiring layer 38 is, for example, a power supply wire, ground wire, row or column selection wire to select the light-receiving element that outputs the pixel signal, a wire to transmit the pixel signal that is output, or the like. The wiring layer 38 may, for example, be made of a metal such as aluminum. In FIG. 2, for the sake of convenience, only three types of wiring 38a, 38b, and 38c are depicted as being layered. The image pickup element 11 in FIG. 2 thus has the structure of a front surface irradiation-type image pickup element.

Figure 4:
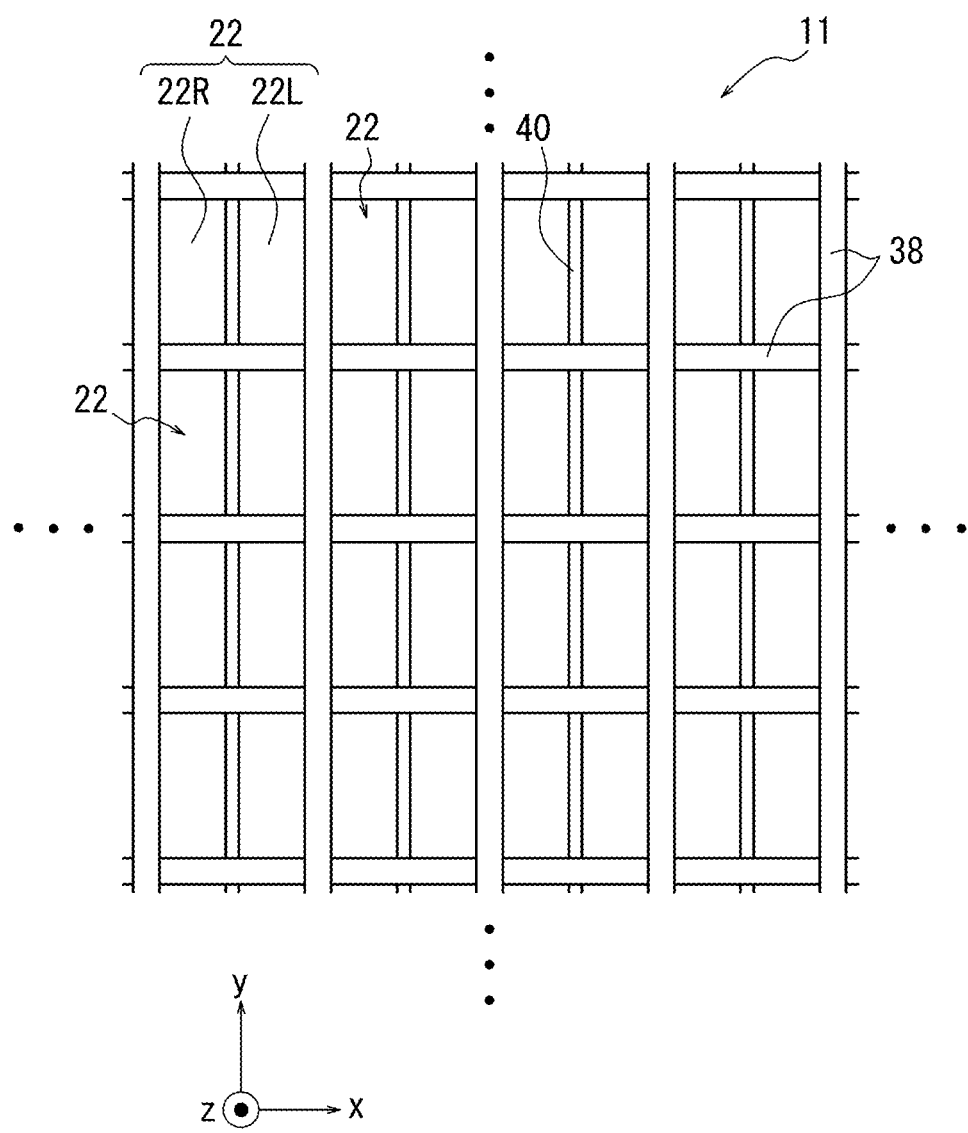
FIG. 4 is a plan view schematically illustrating the structure of a section of the image pickup element in FIG. 2.

In this embodiment, the image pickup element 11 includes a dividing wall 40 that is a light-controlling member between the light-receiving elements 22L and 22R that constitute each pair of light-receiving elements 22. The dividing wall 40 is preferably made of a light-blocking metal such as aluminum and is formed directly on the inter-element separation layer 22i between the light-receiving elements 22L and 22R, or with a medium such as SiO$_2$ therebetween. It suffices for the dividing wall 40 to be formed along at least a portion of the area between the light-receiving elements 22L and 22R, yet the dividing wall 40 is preferably formed along the entire area between the light-receiving elements 22L and 22R in the direction of the y-axis. FIG. 4 is a schematic plan view of the pairs of light-receiving element 22, wiring layer 38, and dividing wall 40 when the dividing wall 40 is formed along the entire area in the direction of the y-axis. In FIG. 2, except for the color filter 36, wiring layer 38, dividing wall 40, and the like, the space between the microlens 20 and the light-receiving surface 200 of the light-receiving elements 22L and 22R is filled with a transparent medium, such as organic material or SiO$_2$.

In the image pickup element 11 in FIG. 2, the surface of the microlenses 20 is disposed on the expected focal plane of the imaging optical system 10, and the exit pupil 34 of the imaging optical system 10 is coupled with the pairs of light-receiving elements 22. Accordingly, the object light 100 that has passed through the imaging optical system 10 is collected on each microlens 20, passes through the color filter 36, and is incident on the light-receiving elements 22L and 22R of the pair of light-receiving elements 22. Light that is one of the colors of R, G, and B thus strikes the light-receiving elements 22L and 22R and forms an image of the object in the image pickup element 11. From the light-receiving element 22L, a pixel signal of a pixel forming the left-eye captured image is thus obtained. From the light-receiving element 22R, a pixel signal of a pixel forming the right-eye captured image is obtained.

Figure 5:
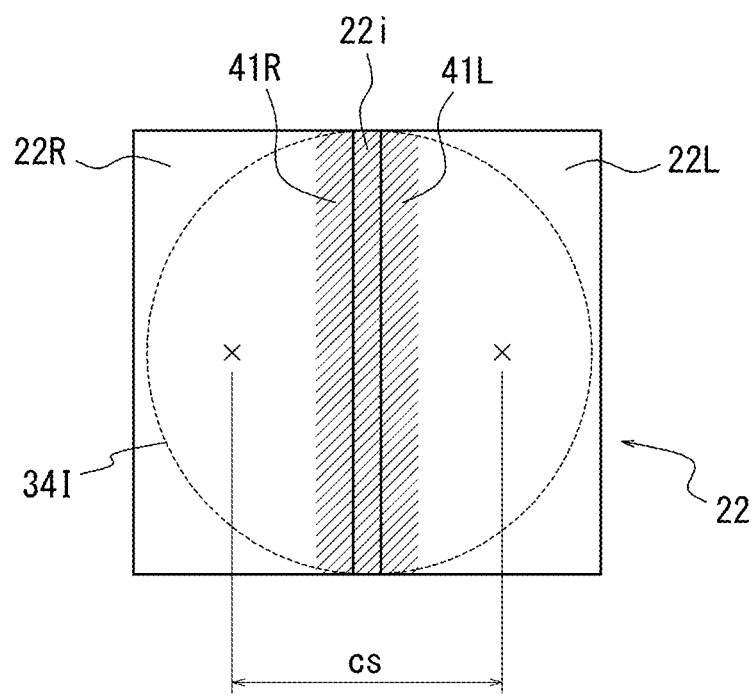
FIG. 5 illustrates the effect of the dividing wall in FIG. 2.
Figure 10:
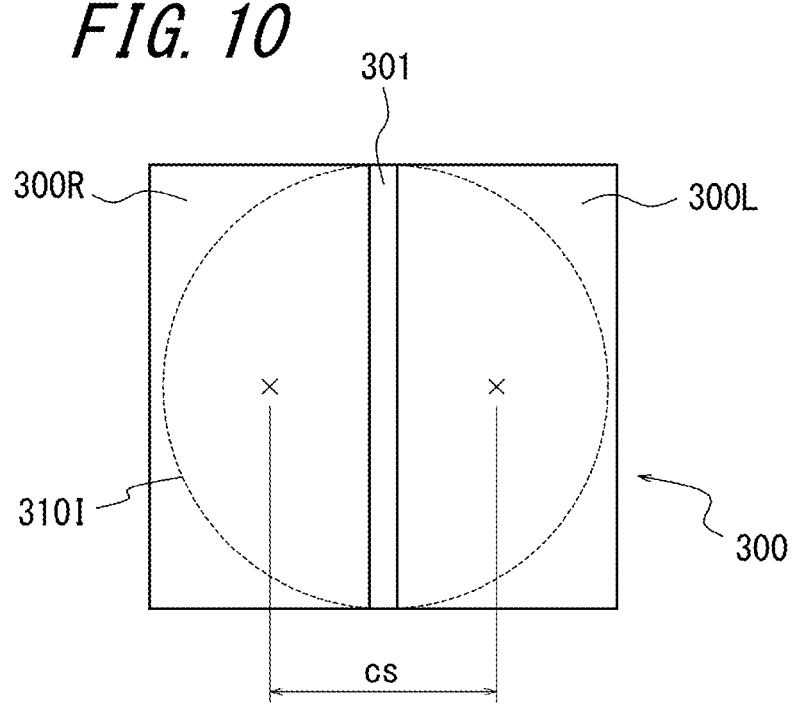
FIG. 10 illustrates the problems with a background image pickup element.

Among the object light 100 entering each picture element, with the direction of the y-axis traversing the optical axis O of the imaging optical system 10 as a boundary, the light beam 100L traversing the left-side pupil of the exit pupil 34 strikes the left-eye light-receiving element 22L, and the light beam 100R traversing the right-side pupil of the exit pupil 34 strikes the right-eye light-receiving element 22R. According to the present embodiment, however, light that is about to enter adjacent light-receiving areas of the light-receiving elements 22L and 22R is blocked by the dividing wall 40 and does not reach the light-receiving elements 22L and 22R. Hence, as illustrated in FIG. 5, in the area near the inter-element separation layer 22i of the light-receiving elements 22L and 22R, dead zones 41L and 41R are formed. As a result, in the exit pupil image 341 formed on the pair of light-receiving elements 22, the inter-centroid distance cs of the images of the left and right pupils, indicated by the x's, is greater than the inter-centroid distance cs when the dead zone is only the inter-element separation layer, as illustrated in FIG. 10. A large parallax can thus be achieved, and the depth resolution of the stereoscopic image can be improved.

The height h of the dividing wall 40, in the direction of the z-axis, from the light-receiving surface 200 of the pair of light-receiving elements 22 is now considered. Letting the focal length of the microlens 20 be fm and the pitch of the microlens 20 be p, then the distance s from the center of the picture element 22 (center of the inter-element separation layer 22i) to the light beam striking from closest to the periphery of the microlens 20, within the light beam that is incident on the picture element 22 without being blocked by the dividing wall 40, is represented by Equation (1) below.

$$s = \frac{p \cdot h}{2(fm - h)} \qquad \text{Equation (1)}$$

As for the upper limit on the height h, in the following case, $$s > p/3, \qquad \text{Equation (2)}$$

the amount of light reaching the pair of light-receiving elements 22 reduces, and the image darkens.

Therefore, based on Equations (1) and (2), the upper limit on the height h of the dividing wall 40 preferably satisfies Equation (3) below.

$$h \leq \frac{2}{5} fm \qquad \text{Equation (3)}$$

The lower limit on the height h can be set based on the extent to which the depth resolution reduces. Below, it is assumed that the imaging optical system 10 is an image-side telecentric imaging optical system with focal length f: 25 mm and brightness F: 1.8. The image pickup element 11 is assumed to meet the four-thirds standard (height H: 13 mm, width W: 17.3 mm). The stereoscopic image is assumed to be displayed on a high-resolution 37-inch display device (height H: 461 mm, width W: 818 mm) separate from the image pickup apparatus 1. The interpupillary distance IPD of the observer is assumed to be a standard value of 63 mm.

In general, a person's parallactic angle resolution capability is 30 s. Hence, if the parallactic angle Δϕ is 30 s, depth can be recognized. Therefore, when viewing a 37-inch display device at a distance of 311, i.e. 3H=3×461 mm=1383 mm, a parallactic angle Δϕ of 30 s means that the parallax Δxd of the left and right display images on the display device is approximately 0.403 mm, based on Equation (4) below.

$$\Delta xd = \frac{(2Dv^2 + 2(IPD/2)^2)\tan\frac{\Delta\phi}{2}}{IPD/2 \times \tan\frac{\Delta\phi}{2} - Dv} \qquad \text{Equation (4)}$$

Figure 6:
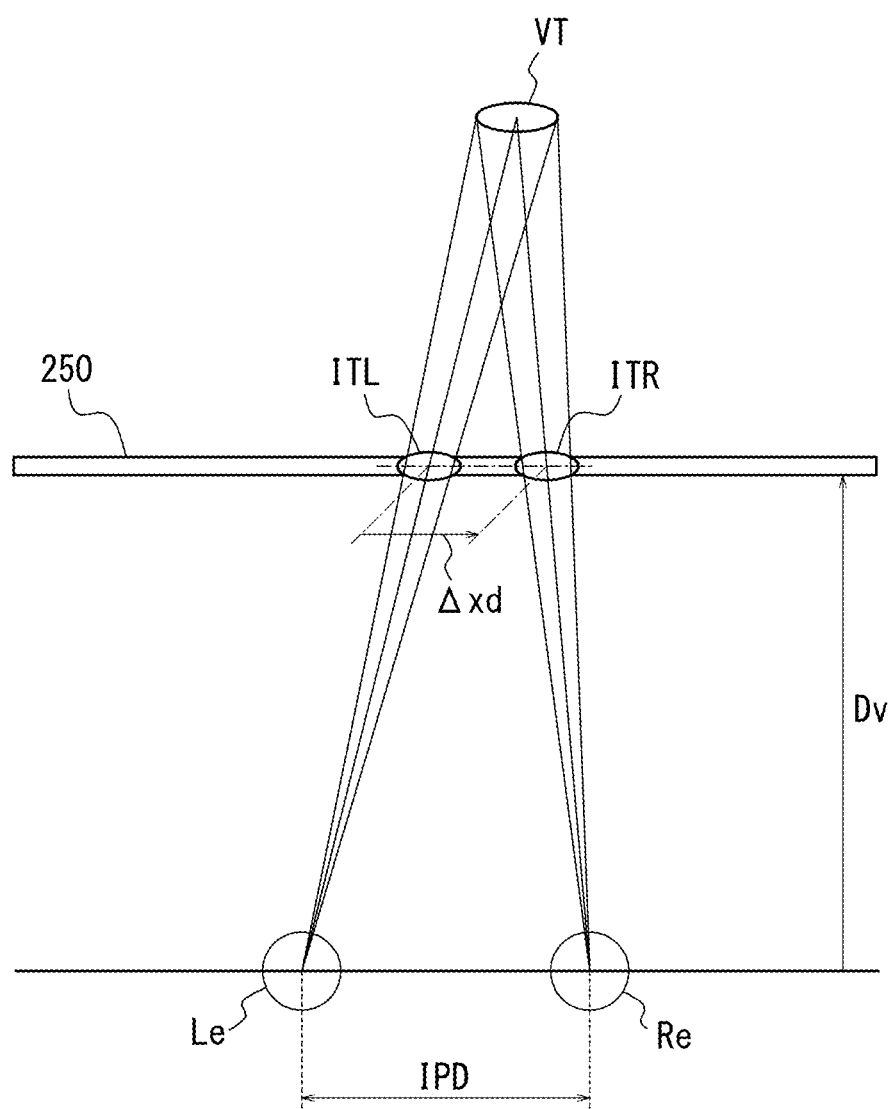
FIG. 6 illustrates the parameters of a display system that displays a stereoscopic image.

FIG. 6 illustrates parameters of a display system that includes a display device 250 for the above case. In FIG. 6, Re indicates the right eye of the observer, Le indicates the left eye of the observer, ITR indicates a right-eye display image displayed on the display device 250, ITL indicates a 1.5 left-eye display image displayed on the display device 250, and VT indicates a 3D image. Dv is the distance from the display device 250 to the observer, which in this case is 3H=1383 mm.

The base-line length SB of the imaging system that includes the imaging optical system 10 and the image pickup element 11 can be calculated with Equation (5) below.

$$SB = -\frac{\Delta xd}{Msd} \times \frac{Zo - f}{Zo0 - Zo} \times \frac{Zo0 - f}{f} \quad \text{Equation (5)}$$

Figure 7:
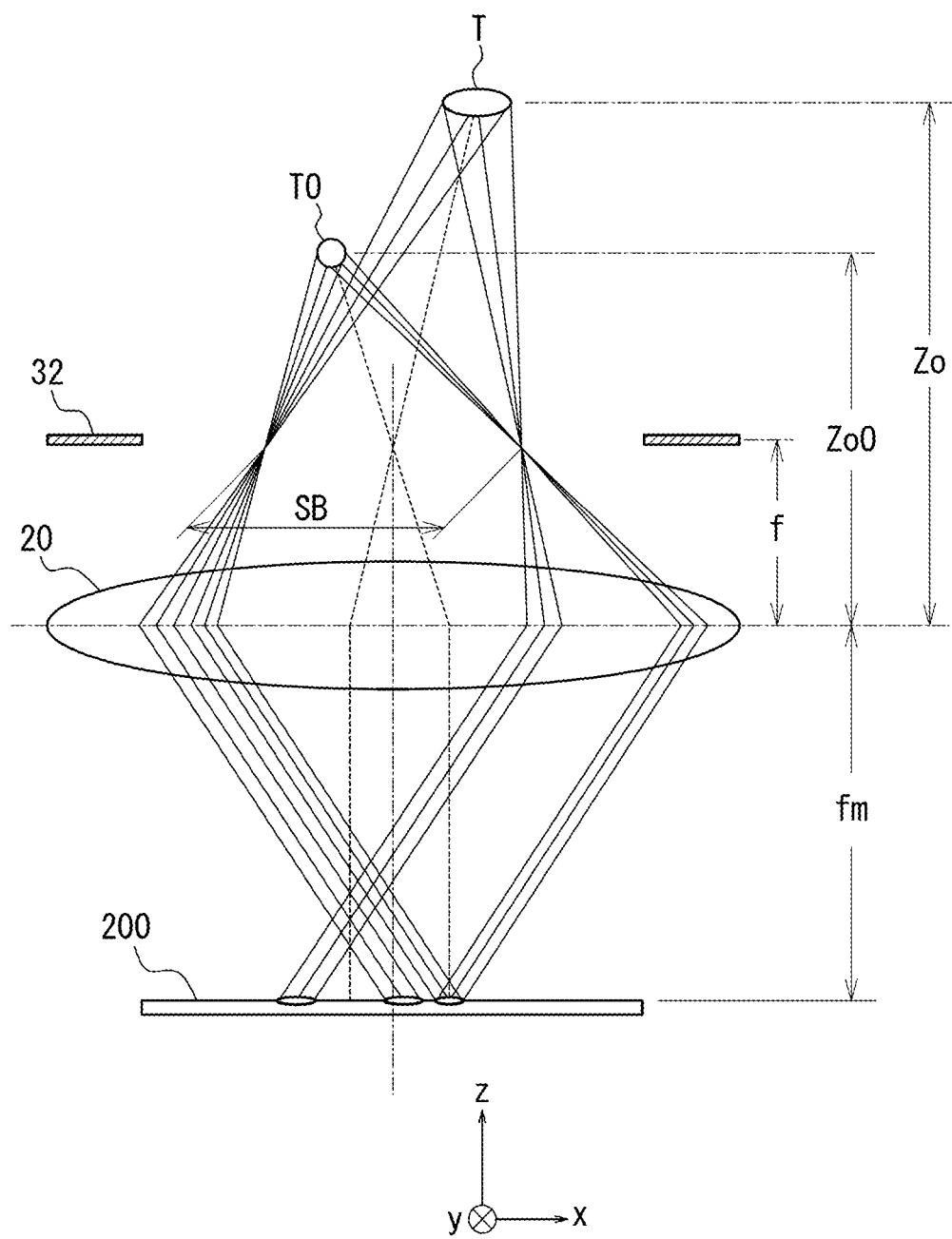
FIG. 7 illustrates the parameters of an imaging system that captures a stereoscopic image.

FIG. 7 illustrates parameters of an imaging system for the above case. In FIG. 7, the base-line length SB is represented as the distance between the center of the right-side area and the center of the left-side area of the entrance pupil in the imaging optical system 10. Zo0 is the distance from the expected focal plane to an object TO that is in focus, Zo is the distance from the expected focal plane to an object T that is not in focus (object for which a sense of depth is obtained), and fm is the focal length of the microlens 20. In Equation (5), Msd is the size ratio between the display device 250 and the image pickup element 11. In this case, since the width W of the 37-inch display device 250 is 818 mm, and the width W of the four-thirds image pickup element 11 is 17.3 mm, it follows that Msd is 818/17.3, or approximately 47.3.

For example, when resolving a depth of 100 mm in a stereoscopic image captured at an object distance of 950 mm, ZoO=950 mm and Zo=1050 mm in Equation (5). From Equation (4), Δxd is approximately 0.403 mm. Substituting these values and the value of the focal length (f=25 mm) into Equation (5) yields a value of approximately 3.23 mm for the base-line length SB. Therefore, in a stereoscopic image captured at an object distance of approximately 1000 mm, a base-line length SB of at least 3.23 mm is necessary to resolve a depth of 100 mm.

When the imaging optical system 10 has a focal length f of 25 mm and a brightness F of 1.8, the entrance pupil diameter ap=f/F is approximately 13.9 mm. This entrance pupil image is formed on the pair of light-receiving elements 22 by the microlens 20. The entrance pupil and the exit pupil are optically equivalent. The focal length fm of the microlens 20 is normally set so that the diameter of the exit pupil image is the pitch p of the microlenses 20. Therefore, for example by setting p=0.01 mm, the focal length fm of the microlens 20 becomes approximately 0.018 mm as calculated by geometrical proportion.

The inter-centroid distance cs of the images of the left and right pupils on the pair of light-receiving elements 22 is a distance of 4R/(3π), with the centroid of the semicircle of radius R being inwards (towards the bow) from the linear portion (string). When there is no dead zone in the central region of the pair of light-receiving elements 22 (see FIG. 10), the radius of the pupil image is p/2, yielding Equation (6).

$$cs = 4 \times (p/2)/(3\pi) \times 2 = 4p/(3\pi) \quad \text{Equation (6)}$$

Accordingly, by setting p=0.01 mm, the inter-centroid distance cs of the images of the left and right pupils on the pair of light-receiving elements 22 is approximately 0.0042 mm from Equation (6).

At the position of the entrance pupil in the imaging optical system 10, the distance ct between the left and right centroids of the entrance pupil is represented as follows.

$$ct = 4 \times (ap/2)/(3\pi) \quad \text{Equation (7)}$$

When the entrance pupil diameter ap is 13.9 mm, the distance ct between the left and right centroids of the entrance pupil corresponding to the base-line length is 2×13.9/(3π), or approximately 2.95 mm. This is smaller than the above value of SB=3.23 mm. Therefore, when there is no dead zone in the central region of the pair of light-receiving elements 22, depth resolution of 100 mm cannot be obtained at an object distance of approximately 1000 mm.

To heighten (decrease) the depth resolution, the height h of the dividing wall 40 in FIG. 2 is increased. As h increases, the light beam reaching between the left and right light-receiving elements 22L and 22R is reduced, and the distance between the centroids of the left and right images formed on the left and right light-receiving elements 22L and 22R increases. In order to attain a depth resolution of at least 100 mm at an object distance of approximately 1000 mm, the inter-centroid distance of the entrance pupil needs to be at least 3.23 mm, as described above. Therefore, the height h of the dividing wall 40 needs to be at least 0.0023 mm. In this case, the ratio hr of the minimum value of the height of the dividing wall 40 and the focal length fm of the microlens 20 is 0.0023/0.018, or approximately 0.128.

Based on the above, the height h of the dividing wall 40 from the light-receiving surface 200 of the pair of light-receiving elements 22 is preferably set as follows:

$$0.128 \, fm \le h \le 2/5 \, fm.$$

Embodiment 2

Figure 8:
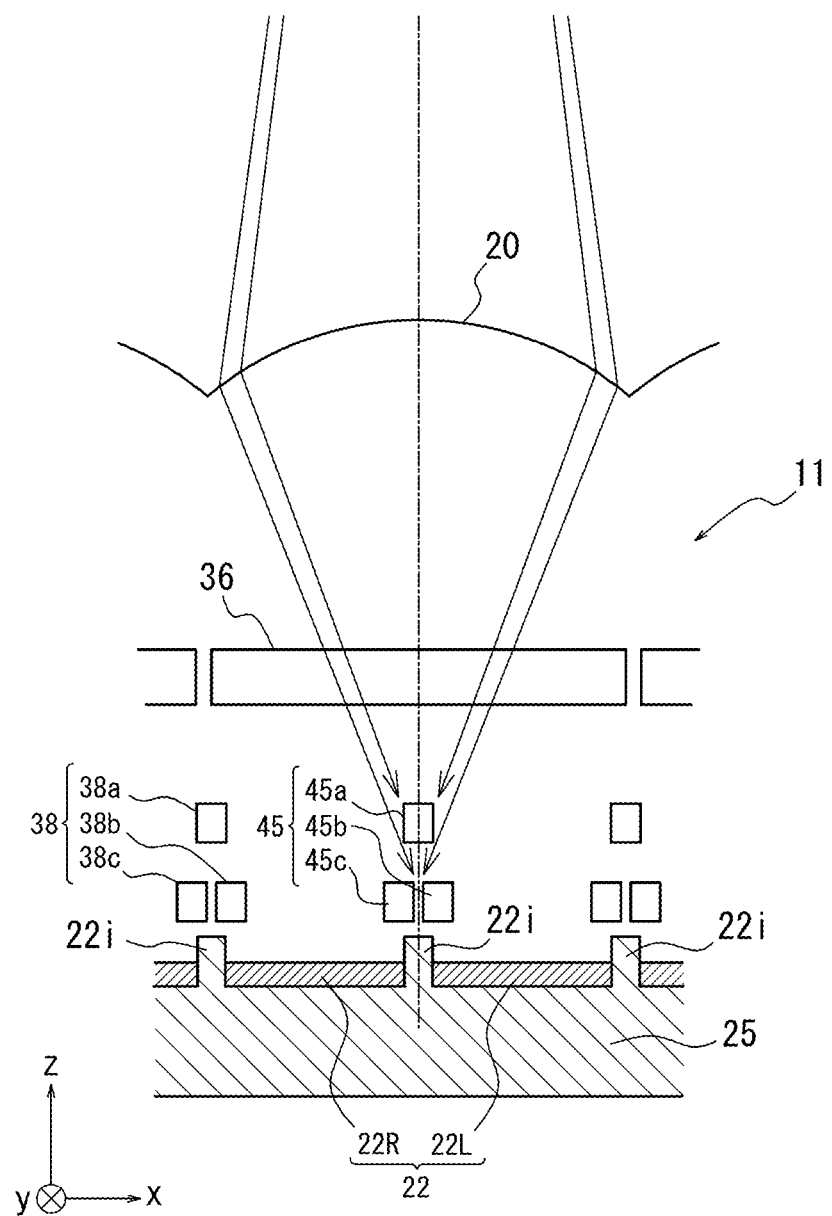
FIG. 8 schematically illustrates the structure of a section of an image pickup apparatus according to Embodiment 2.

FIG. 8 is a cross-sectional diagram of an imaging optical system and image pickup element along the optical axis of the imaging optical system, schematically illustrating the structure of an image pickup apparatus according to Embodiment 2. In FIG. 8, the same structural components as in FIG. 2 bear the same reference signs, and a description thereof is omitted. In this embodiment, instead of the dividing wall 40 in FIG. 2, the image pickup element 11 includes a wiring layer 45 extending along the y-axis between the light-receiving elements 22L and 22R that constitute each pair of light-receiving elements 22. Like the wiring layer 38, the wiring layer 45 is made of a metal such as aluminum and is formed by stacking different types of wiring. In FIG. 8, for the sake of convenience, only three types of wiring 45a, 45b, and 45c are depicted as being layered, like the wiring layer 38 stacked between pairs of light-receiving elements 22. The wiring layer 45 may be a combination of the same types of wiring as the wiring layer 38 or a combination of different wiring. Furthermore, the number of stacked layers need not be the same. In the wiring layer 45, the height h of the tallest wiring 45a from the light-receiving surface 200 of the pair of light-receiving elements 22 is preferably such that 0.128 fm≤h≤2/5 fm, as in Embodiment 1, where fm is the focal length of the microlens 20.

By thus providing the wiring layer 45 between the light-receiving elements 22L and 22R that form each pair of light-receiving elements 22, light that is about to enter adjacent light-receiving areas of the light-receiving elements 22L and 22R is blocked by the wiring 45a, 45b, and 45c of the wiring layer 45 and does not reach the light-receiving elements 22L and 22R. In other words, the wiring layer 45 also functions as a light-controlling member. Accordingly, as in Embodiment 1, the inter-centroid distance cs of the left and right pupil images in which dead zones 41L and 41R form, as illustrated in FIG. 5, in the area near the inter-element separation layer 22i of the light-receiving elements 22L and 22R is greater than the inter-centroid distance cs when the dead zone is only the inter-element separation layer, as illustrated in FIG. 10. A large parallax is thus achieved, and the depth resolution of the stereoscopic image can be improved. Furthermore, by having the wiring layer 45 also function as the light-controlling member, an additional structure becomes unnecessary, simplifying the manufacturing of the image pickup element 11.

Figure 9:
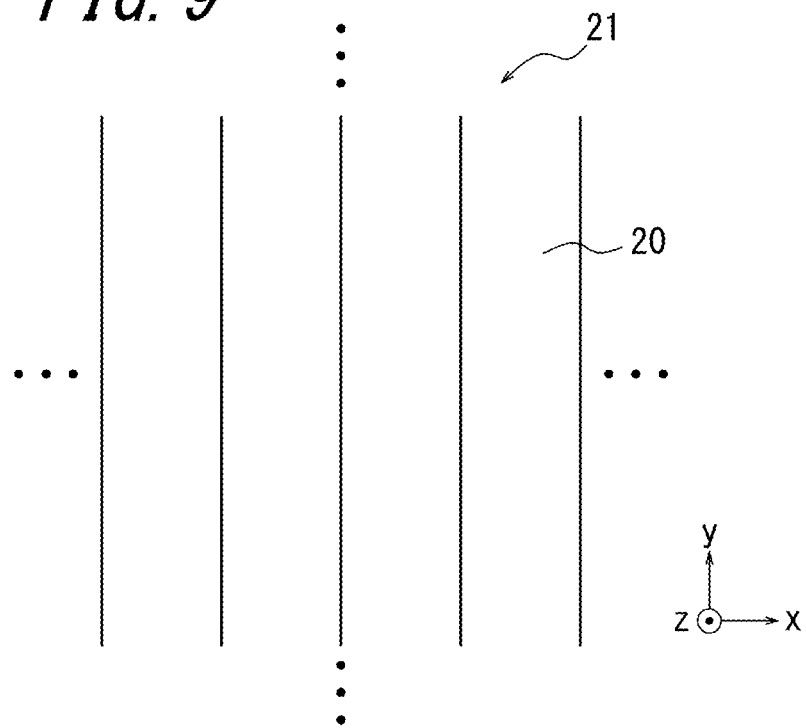
FIG. 9 is a plan view of a cylindrical microlens.

Although this disclosure is based on drawings and examples, it is to be noted that various changes and modifications will be apparent to those skilled in the art based on this disclosure. Therefore, such changes and modifications are to be understood as included within the scope of the disclosure. For example, the functions and the like included in the various structural components and the like may be reordered in any logically consistent way. Furthermore, components may be combined into one or divided. For example, in Embodiment 1, the microlenses 20 of the image pickup element 11 may be in a honeycomb array. Furthermore, the microlenses 20 are not limited to being circular in shape and may instead be rectangular, with the perimeters of adjacent microlenses in the array being in contact. The microlenses 20 are not limited to spherical or aspherical microlenses disposed for each picture element. As illustrated in the plan view in FIG. 9 as seen from the z-axis direction, each microlens may be a cylindrical lens that extends along the y-axis in correspondence with a plurality of picture elements along the y-axis and that has a lens effect in the direction of the x-axis.

A structure including a dividing wall 40 as in Embodiment 1 may also be applied to a back surface irradiation-type image pickup element. Furthermore, a structure may be adopted to obtain the same effects by appropriately setting the width in the direction of the x-axis of the light-controlling member, such as the dividing wall 40 or the wiring layer 45, instead of the height from the light-receiving surface 200 of the pair of light-receiving elements 22 or in addition to the height. A structure may also be adopted to achieve the same effects by providing a mask as the light-controlling member on the light-receiving surface 200 of the pair of light-receiving elements 22. A structure may also be adopted to cause the inter-element separation layer 22$i$ of the pair of light-receiving elements 22 additionally to function as the light-controlling member by increasing the width of the inter-element separation layer 22$i$ in the direction of the x-axis.

REFERENCE SIGNS LIST

1: Image pickup apparatus
10: Imaging optical system
11: Image pickup element
20: Microlens
22: Pair of light-receiving elements
22L, 22R: Light-receiving element
40: Dividing wall
45: Wiring layer
200: Light-receiving surface

The invention claimed is:
1. An image pickup element comprising:
a plurality of two-dimensionally arranged micro lenses;
a pair of light-receiving elements corresponding to the microlenses; and
a light-controlling member configured to control incidence of light onto adjacent light-receiving areas of the pair of light-receiving elements, wherein

$$0.128 \text{ fm} \leq h \leq 2/5 \text{ fm},$$

where h is a height of the light-controlling member from a light-receiving surface of the pair of light-receiving elements, and fm is a focal length of the microlenses.

2. The image pickup element of claim 1, wherein the light-controlling member is a dividing wall.

3. The image pickup element of claim 1, wherein the light-controlling member is a wiring layer.

4. An image pickup apparatus comprising:
an imaging optical system configured to capture an object image; and the image pickup element of claim 1, disposed on an expected focal plane of the imaging optical system.

* * * * *